United States Patent
Zou et al.

(10) Patent No.: US 9,040,209 B2
(45) Date of Patent: *May 26, 2015

(54) MULTI-LAYER POLYELECTROLYTE MEMBRANES

(75) Inventors: Lijun Zou, Rochester, NY (US); Scott C. Moose, Victor, NY (US); Timothy J. Fuller, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 114 days.

This patent is subject to a terminal disclaimer.

(21) Appl. No.: 13/364,869

(22) Filed: Feb. 2, 2012

(65) Prior Publication Data

US 2013/0202987 A1 Aug. 8, 2013

(51) Int. Cl.
*H01M 2/14* (2006.01)
*H01M 8/10* (2006.01)

(52) U.S. Cl.
CPC .......... *H01M 8/1023* (2013.01); *H01M 8/1025* (2013.01); *H01M 8/1039* (2013.01); *H01M 8/1053* (2013.01); *H01M 8/1081* (2013.01); *Y02E 60/521* (2013.01)

(58) Field of Classification Search
USPC .................. 429/492, 483, 493, 494
See application file for complete search history.

(56) References Cited

U.S. PATENT DOCUMENTS

| 6,562,446 | B1 * | 5/2003 | Totsuka ..................... 428/304.4 |
| 7,754,837 | B1 * | 7/2010 | Smith et al. ................... 526/247 |
| 7,888,433 | B2 | 2/2011 | Fuller et al. |
| 7,897,691 | B2 | 3/2011 | MacKinnon et al. |
| 7,897,692 | B2 | 3/2011 | MacKinnon et al. |
| 7,897,693 | B2 | 3/2011 | MacKinnon et al. |
| 8,053,530 | B2 | 11/2011 | Fuller |
| 2007/0087245 | A1 * | 4/2007 | Fuller et al. ..................... 429/33 |
| 2007/0099054 | A1 | 5/2007 | Fuller et al. |
| 2009/0278083 | A1 * | 11/2009 | Fuller et al. ................ 252/182.1 |
| 2011/0159405 | A1 | 6/2011 | Fuller et al. |
| 2013/0022895 | A1 * | 1/2013 | Jiang et al. .................... 429/494 |

FOREIGN PATENT DOCUMENTS

DE 10 2010 055 227 A 7/2011
EP 0853824 * 10/1996

* cited by examiner

*Primary Examiner* — Stewart Fraser
*Assistant Examiner* — Olatunji Godo
(74) *Attorney, Agent, or Firm* — Brooks Kushman P.C.

(57) ABSTRACT

A multilayer polyelectrolyte membrane for fuel cell applications includes a first perfluorocyclobutyl-containing layer that includes a polymer having perfluorocyclobutyl moieties. The first layer is characteristically planar having a first major side and a second major side over which additional layers are disposed. The membrane also includes a first PFSA layer disposed over the first major side of the first layer and a second PFSA layer disposed over the second major side of the first layer.

13 Claims, 10 Drawing Sheets

MULTI-LAYER POLYELECTROLYTE MEMBRANES

TECHNICAL FIELD

In at least one aspect, the present invention relates to ion conducting membranes for fuel cells, and in particular to ion conducting membranes having a multilayer structure.

BACKGROUND

Fuel cells are used as an electrical power source in many applications. In particular, fuel cells are proposed for use in automobiles to replace internal combustion engines. A commonly used fuel cell design uses a solid polymer electrolyte ("SPE") membrane or proton exchange membrane ("PEM") to provide ion transport between the anode and cathode.

In proton exchange membrane type fuel cells, hydrogen is supplied to the anode as fuel and oxygen is supplied to the cathode as the oxidant. The oxygen can either be in pure form ($O_2$) or air (a mixture of $O_2$ and $N_2$). PEM fuel cells typically have a membrane electrode assembly ("MEA") in which a solid polymer membrane has an anode catalyst on one face, and a cathode catalyst on the opposite face. The anode and cathode layers of a typical PEM fuel cell are formed of porous conductive materials, such as woven graphite, graphitized sheets, or carbon paper to enable the fuel and oxidant to disperse over the surface of the membrane facing the fuel- and oxidant-supply electrodes, respectively. Each electrode has finely divided catalyst particles (for example, platinum particles) supported on carbon particles to promote oxidation of hydrogen at the anode and reduction of oxygen at the cathode. Protons flow from the anode through the ionically conductive polymer membrane to the cathode where they combine with oxygen to form water which is discharged from the cell. The MEA is sandwiched between a pair of porous gas diffusion layers ("GDL") which, in turn, are sandwiched between a pair of non-porous, electrically conductive elements or plates. The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cell stacks in order to provide high levels of electrical power. Although the membranes used in such fuel cells work reasonably well, the prior art membrane still suffers drawbacks related to stability, strength, and costs.

Accordingly, there is a need for improved ion-conducting membranes for fuel cell application.

SUMMARY

The present invention solves one or more problems of the prior art by providing a multilayer polyelectrolyte membrane for fuel cell applications. The membrane includes a first perfluorocyclobutyl-containing layer that includes a polymer having perfluorocyclobutyl moieties. The first layer is characteristically planar having a first major side and a second major side over which additional layers are disposed. The membrane also includes a first PFSA layer disposed over the first major side of the first layer and a second PFSA layer disposed over the second major side of the first layer.

In another embodiment, a multilayer polyelectrolyte membrane for a fuel cell is provided. The membrane includes a first perfluorocyclobutyl-containing layer including a polymer having perfluorocyclobutyl moieties. Characteristically, the first perfluorocyclobutyl layer has a first major side and a second major side. The membrane further includes a support layer disposed over the first major side of the first perfluorocyclobutyl layer.

In another embodiment, a method for forming a multilayer polyelectrolyte membrane is provided. The method includes a step of depositing a first perfluorocyclobutyl-containing layer from a PFCB solid in liquid composition. In a subsequent step, a first PFSA-containing layer is deposited from a PFSA solid in liquid composition. The first PFSA containing layer is disposed over a first major side of the first perfluorocyclobutyl-containing layer.

BRIEF DESCRIPTION OF THE DRAWINGS

Exemplary embodiments of the present invention will become more fully understood from the detailed description and the accompanying drawings, wherein.

DETAILED DESCRIPTION

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Figure 1:
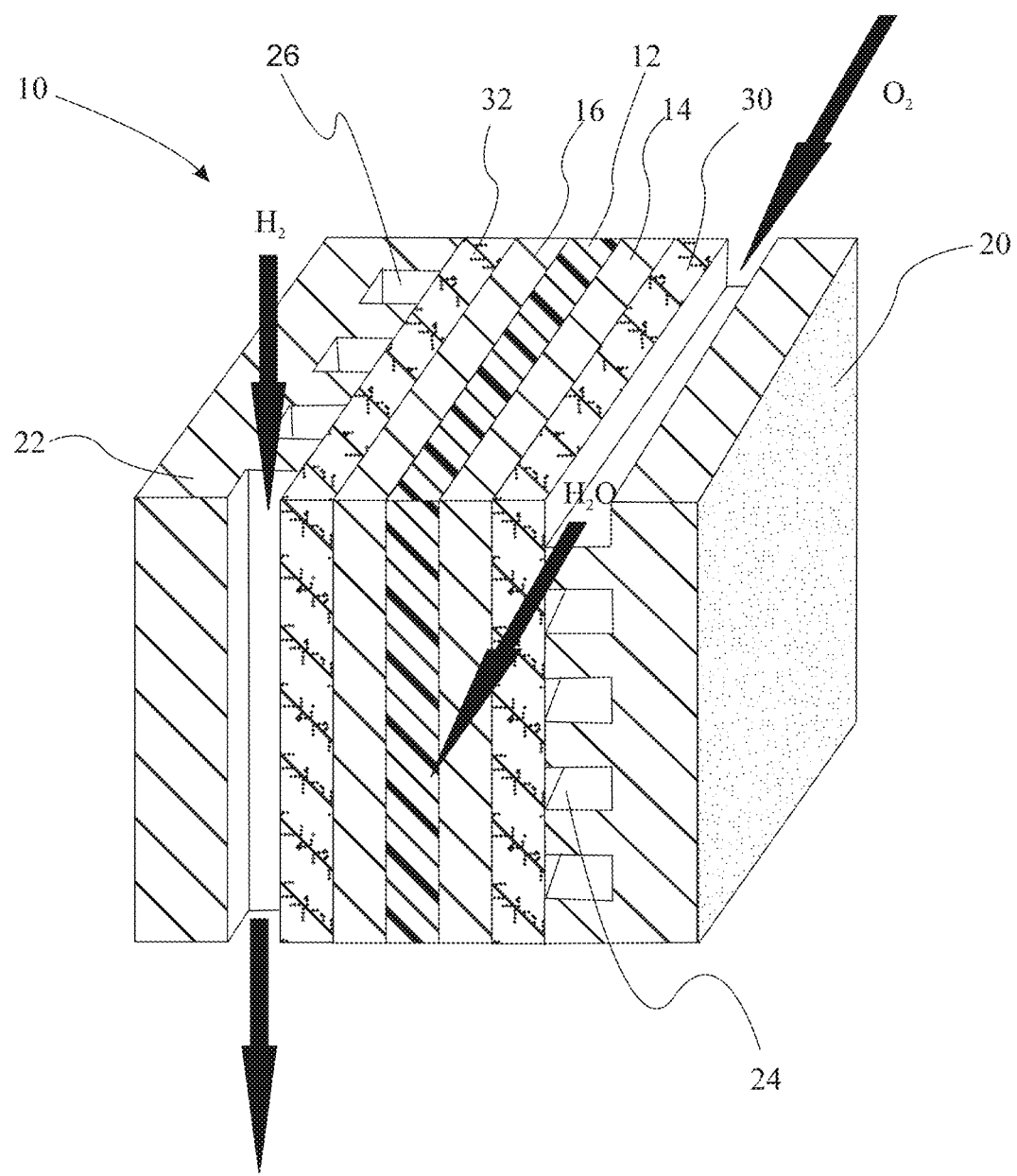
FIG. 1 is a schematic illustration of a fuel cell that incorporates catalyst layers of one or more embodiments of the invention.

With reference to FIG. 1, a fuel cell that incorporates a multilayer ion conducting membrane of one or more embodiments of the invention is provided. PEM fuel cell 10 includes multilayer ion conductive membrane 12 disposed between cathode catalyst layer 14 and anode catalyst layer 16. Fuel cell 10 also includes flow field plates 20, 22, gas channels 24 and 26, and gas diffusion layers 30 and 32.

Figure 2:
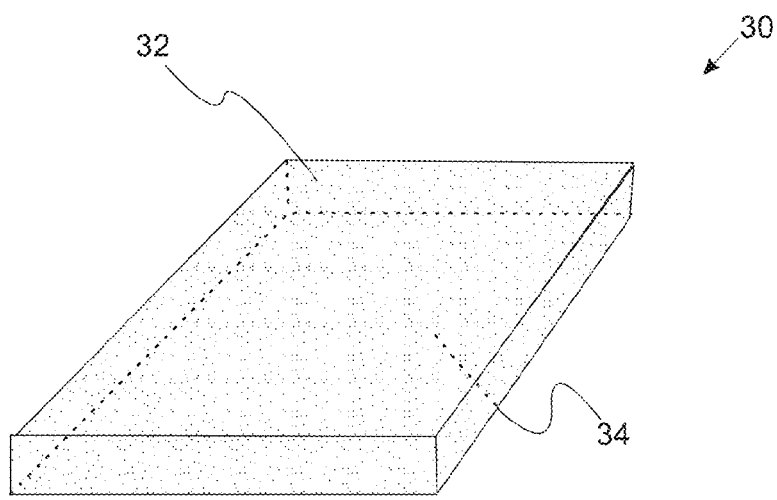
FIG. 2 is a perspective view of a perfluorocyclobutyl-containing layer.

With reference to FIGS. 2 and 3A-E, a schematic of a layer including perfluorocyclobutyl (PFCB) moieties to be included in a multilayer ion conducting membrane is provided. FIG. 2 is a perspective view of a perfluorocyclobutyl-containing layer. Layer 30, which includes perfluorocyclobutyl moieties, includes first major side 32 and second major side 34. It should also be appreciated that each of the layers set forth below also independently include a first major side and a second major side. In the variations set forth below, additional layers are disposed over first major side 32 and optionally over second major side 34.

Figure 3A:
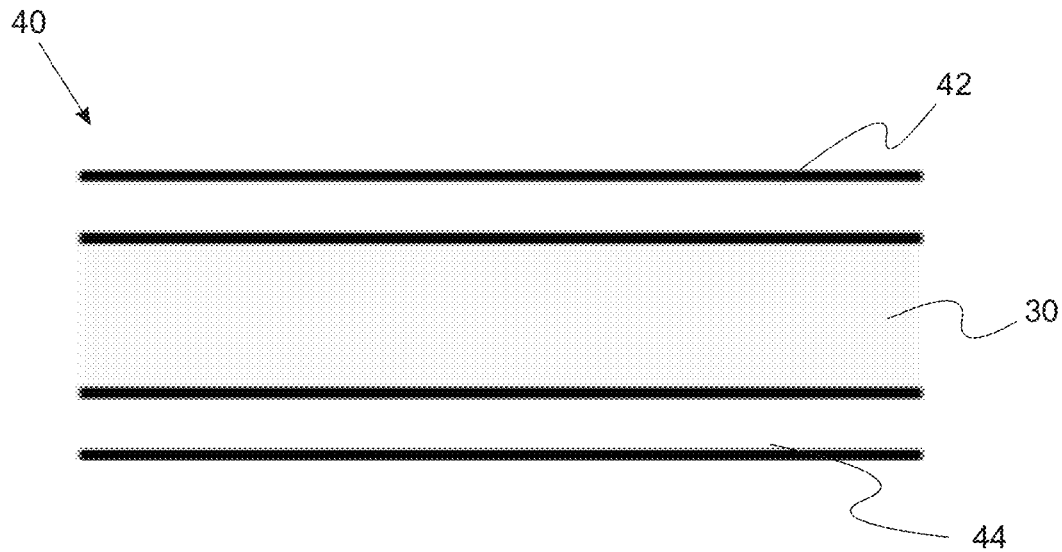
FIG. 3A is a schematic cross section of a multilayer ion conducting membrane including a PFCB-containing layer and two PFSA skins.

FIG. 3A is a schematic cross section of a multilayer ion conducting membrane including a perfluorocyclobutyl-containing layer with two PFSA skins. As used herein "skins" refer to relatively thin layers (i.e., less than 5 microns). Multilayer ion conducting layer 40 includes perfluorocyclobutyl-containing layer 30. Perfluorosulfonic acid (PFSA) layer 42 is disposed over first major side 32 of perfluorocyclobutyl-containing layer 30 while PFSA layer 44 is disposed over second major side 34 of layer 30. In this variation, perfluorocyclobutyl-containing layer 30 is from about 2 to about 8 microns thick while PFSA layers 42 and 44 are about 1 to about 4 microns thick.

Figure 3B:
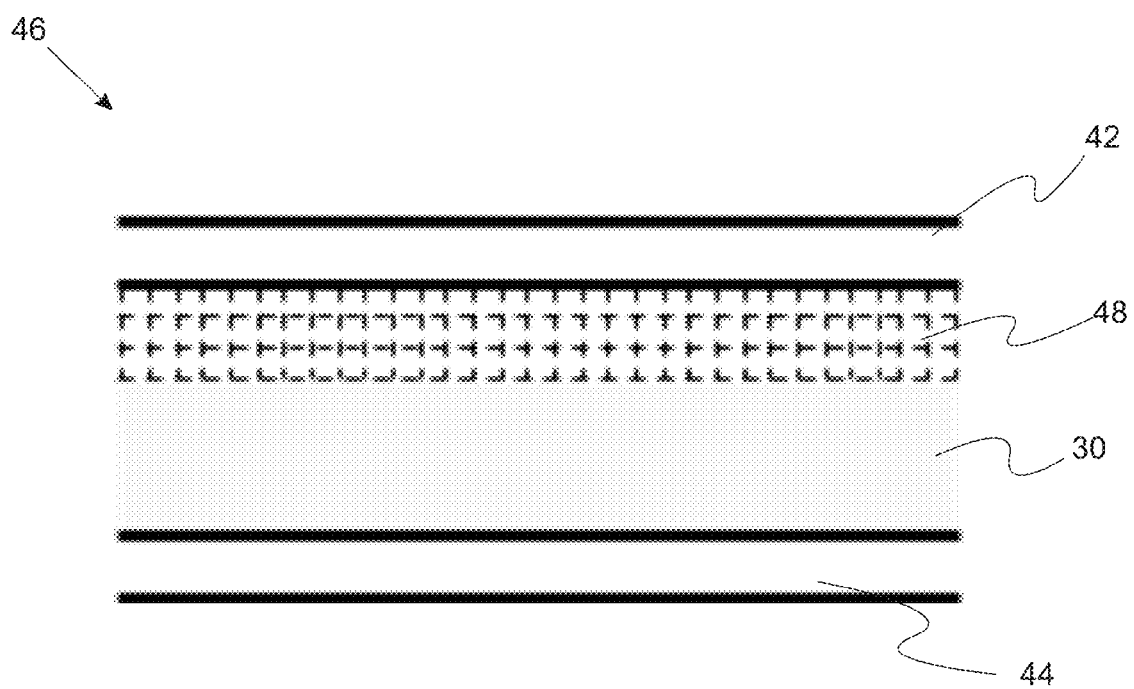
FIG. 3B is a schematic cross section of a multilayer ion conducting membrane including a PFCB-containing layer, a support layer, and two PFSA skins.

FIG. 3B is a schematic cross section of a multilayer ion conducting membrane including a PFCB-containing layer, a support layer, and two PFSA skins. Multilayer ion conducting layer 46 includes perfluorocyclobutyl-containing layer 30. Perfluorosulfonic acid (PFSA) layer 42 is disposed over support layer 48 which is disposed over first major side 32 of layer 30. PFSA layer 44 is disposed over second major side 34 of layer 30. In this variation, perfluorocyclobutyl-containing layer 30 is from about 2 to about 8 microns thick, PFSA layers 42 and 44 are about 1 to about 4 microns thick, and support layer 48 is from about 2 to about 8 microns thick.

Figure 3C:
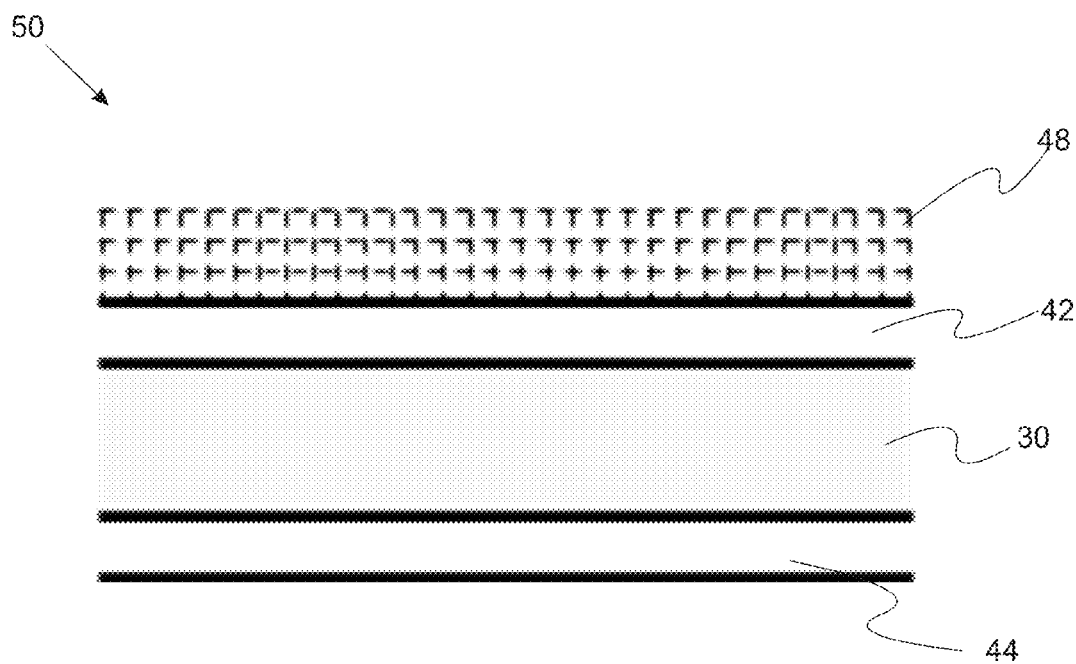
FIG. 3C is a schematic cross section of a multilayer ion conducting membrane including a PFCB-containing layer, a support layer, and two PFSA skins.

FIG. 3C is a schematic cross section of a multilayer ion conducting membrane including a PFCB-containing layer, a support layer, and two PFSA skins. Multilayer ion conducting layer 50 includes perfluorocyclobutyl-containing layer 30. Perfluorosulfonic acid (PFSA) layer 42 is disposed over and contacts first major side 32 of layer 30. PFSA layer 44 is disposed over and contacts second major side 34 of layer 30. Finally, support layer 48 is disposed over and optionally contacts PFSA layer 42. In this variation, perfluorocyclobutyl-containing layer 30 is from about 2 to about 8 microns thick, PFSA layers 42 and 44 are about 1 to about 4 microns thick, and support layer 48 is from about 2 to about 8 microns thick.

Figure 3D:
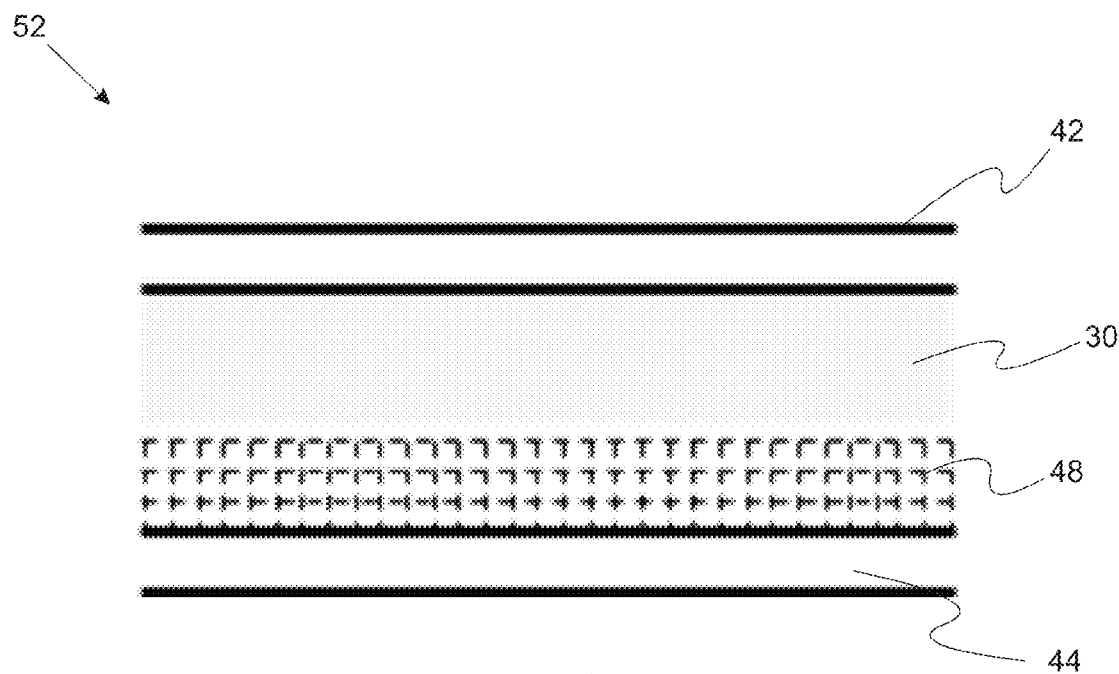
FIG. 3D is a schematic cross section of a multilayer ion conducting membrane including a PFCB-containing layer, a support layer, and two PFSA skins.

FIG. 3D is a schematic cross section of a multilayer ion conducting membrane including a PFCB-containing layer, a support layer, and two PFSA skins. Multilayer ion conducting layer 52 includes perfluorocyclobutyl-containing layer 30. Perfluorosulfonic acid (PFSA) layer 42 is disposed over and contacts first major side 32 of layer 30. Support layer 48 is disposed over and contacts second major side 34 of layer 30. PFSA layer 44 is disposed over and contacts the opposite major side of support layer 48. In a refinement of this variation, perfluorocyclobutyl-containing layer 30 is from about 2 to about 8 microns thick, PFSA layers 42 and 44 are about 1 to about 4 microns thick, and support layer 48 is from about 2 to about 8 microns thick.

Figure 3E:
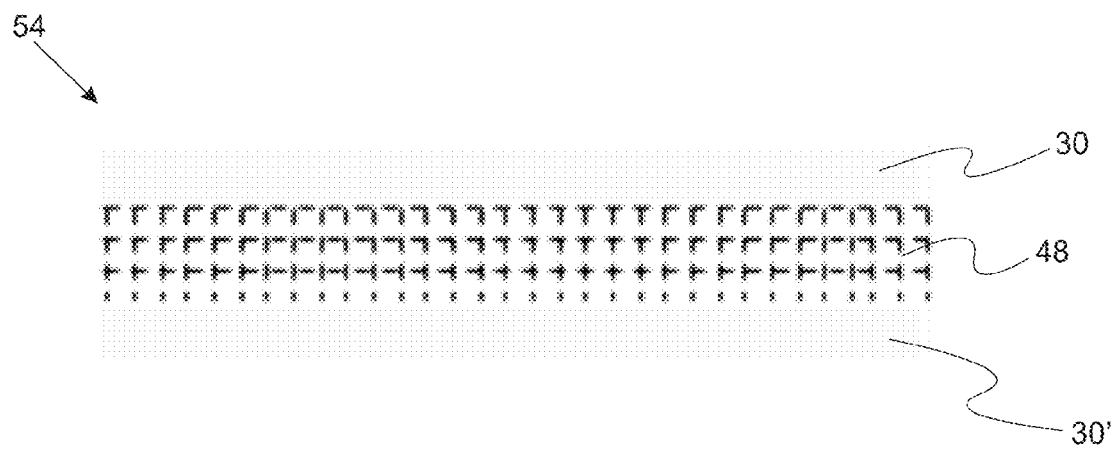
FIG. 3E is a schematic cross section of a multilayer ion conducting membrane including two PFCB-containing layers and a support layer.

FIG. 3E is a schematic cross section of a multilayer ion conducting membrane including two PFCB-containing layers and a support layer and two PFSA skins. Multilayer ion conducting layer 54 includes support layer 48. Perfluorocyclobutyl-containing layer 30 is disposed over and contacts a first major side of support layer 48 while perfluorocyclobutyl-containing layer 30' is disposed over and contacts a second major side of support layer 48. In a refinement of this variation, perfluorocyclobutyl-containing layers 30 and 30' are each independently from about 2 to about 8 microns thick and support layer 48 is from about 2 to about 8 microns thick.

Figure 4:
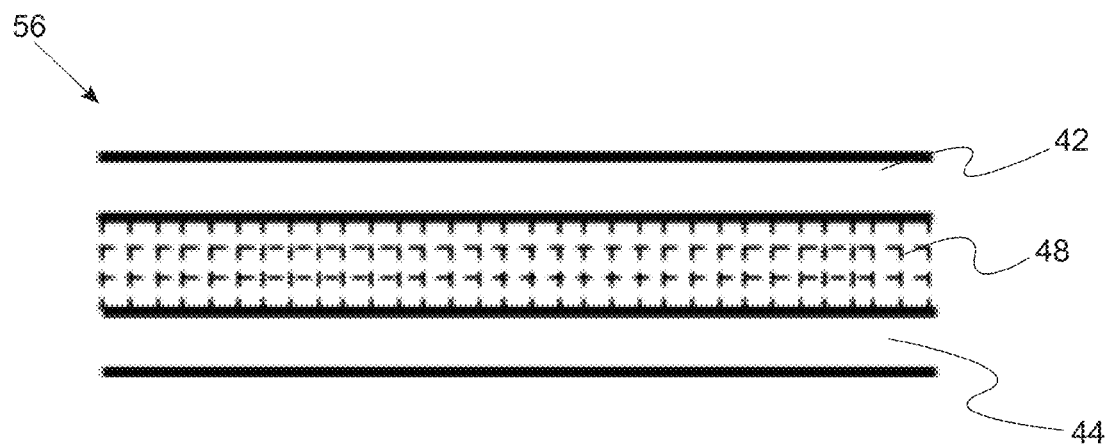
FIG. 4 is a schematic cross section of a multilayer ion conducting membrane including a support layer and two PFSA skins.

With reference to FIG. 4, a schematic cross section of a three layer multilayer ion conducting layer is provided. Multilayer ion conducting layer 56 includes support layer 48. PFSA layer 42 is disposed over and contacts a first major side of support layer 48. PFSA layer 44 is disposed over and contacts a second major side of support layer 48. In a refinement of this variation, PFSA layers 42 and 44 are about 1 to about 4 microns thick and support layer 48 is from about 2 to about 8 microns thick.

As set forth above, various multilayer membrane designs include a support contacting at least one of the perfluorocyclobutyl layers, first PFSA layer or second PFSA layer. Characteristically, the support contacts and is at least partially immersed in the perfluorocyclobutyl-containing layer and the first PFSA layer. In another refinement, the support contacts and is at least partially immersed in the first PFSA layer. In a refinement, the support is contacts and is at least partially immersed in the second layer. In a refinement, the support is an expanded polytetrafluoroethylene support.

In another embodiment, a method of forming a multilayer ion conducting membrane is provided. In accordance with this method, each of the layers set forth in FIGS. 3A-E and 4 are coated out from a liquid composition that includes the polymer therein. Subsequent layers are applied with drying (i.e., solvents removed or allowed to evaporate) or without drying the already deposited layers. For example, with reference to FIG. 3A, PFSA layer 44 is deposited over a substrate from a PFSA containing solids in liquid composition. Typically, such compositions include solvents such as water and/or alcohols (e.g., methanol, ethanol, propanol, dimethylacetamide (DMAc) etc.). Next, layer 30 is deposited from a PFCB-containing solids in liquid composition. Finally, PFSA layer 42 is deposited over a layer 30 from a PFSA containing solids in liquid composition. With reference to FIG. 3B, PFSA layer 44 is deposited over a substrate from a PFSA containing solids in liquid composition. Next, layer 30 is deposited over PFSA layer 44 from a PFCB-containing solids in liquid composition. Support layer 48 is then placed over layer 44. Typically, the first and second major sides of support layer 48 are pretreated with a PFSA and/or PFCB containing composition. Finally, PFSA layer 42 is deposited over a support layer 48 from a PFSA containing solids in liquid composition. Each of the remaining structures in FIGS. 3C-E and 4 are made in an analogous manner. In each of the compositions used for forming the membrane layers, the compositions typically include from about 3 weight percent to about 50 weight percent solvent and about 50 weight percent to about 97 weight percent of the respective polymer (i.e., solids). It should be appreciated that each of the layers may be formed by any number of methods known to those skilled in the art of making polymeric layers. For example, such layer may be formed by Bird applicators and other multiple layer coating methods, such as slot die, slide hopper bead coating, and the like.

As set forth above, several variations of the membranes set forth above include a perfluorosulfonic acid (PFSA) polymer. Examples of useful PFSA polymers include a copolymer containing a polymerization unit based on a perfluorovinyl compound represented by:

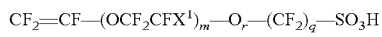

where m represents an integer of from 0 to 3, q represents an integer of from 1 to 12, r represents 0 or 1, and $X^1$ represents a fluorine atom or a trifluoromethyl group and a polymerization unit based on tetrafluoroethylene.

As set forth above, the perfluorocyclobutyl-containing layer(s) include an ion-conducting polymer having perfluorocyclobutyl moieties. Suitable polymers having cyclobutyl moieties are disclosed in U.S. Pat. Pub. No. 2007/0099054, U.S. Pat. No. 7,897,691 issued Mar. 1, 2011; U.S. Pat. No. 7,897,692 issued Mar. 1, 2011; U.S. Pat. No. 7,888,433 issued Feb. 15, 2011, U.S. Pat. No. 7,897,693 issued Mar. 1, 2011; and U.S. Pat. No. 8,053,530 issued Nov. 8, 2011, the entire disclosures of which are hereby incorporated by reference. In a variation, the ion-conducting polymer having perfluorocyclobutyl moieties includes a polymer segment comprising polymer segment 1:

$$E_0\text{-}P_1\text{-}Q_1\text{-}P_2 \qquad\qquad 1$$

wherein:

$E_0$ is a moiety, and in particular, a hydrocarbon-containing moiety, that has a protogenic group such as —$SO_2X$, —$PO_3H_2$, —COX, and the like;

$P_1$, $P_2$ are each independently absent, —O—, —S—, —SO—, —CO—, —$SO_2$—, —NH—, $NR_2$—, or —$R_3$—;

$R_2$ is $C_{1\text{-}25}$ alkyl, $C_{1\text{-}25}$ aryl or $C_{1\text{-}25}$ arylene;

$R_3$ is $C_{1\text{-}25}$ alkylene, $C_{1\text{-}25}$ perfluoroalkylene, perfluoroalkyl ether, alkylether, or $C_{1\text{-}25}$ arylene;

X is an —OH, a halogen, an ester, or

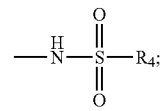

$R_4$ is trifluoromethyl, $C_{1\text{-}25}$ alkyl, $C_{1\text{-}25}$ perfluoroalkylene, $C_{1\text{-}25}$ aryl, or $E_1$ (see below); and $Q_1$ is a fluorinated cyclobutyl moiety.

In a variation of the present invention, the ion-conducting polymer comprises polymer segments 2 and 3:

$$[E_1(Z_1)_d]\text{—}P_1\text{-}Q_1\text{-}P_2 \qquad\qquad 2$$

$$E_2\text{-}P_3\text{-}Q_2\text{-}P_4 \qquad\qquad 3$$

wherein:

$Z_1$ is absent or a protogenic group such as —$SO_2X$, —$PO_3H_2$, —COX, and the like;

$E_1$ is an aromatic containing moiety;

$E_2$ is an unsulfonated aromatic-containing and/or aliphatic-containing moiety;

X is an —OH, a halogen, an ester, or

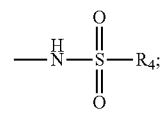

d is the number of $Z_1$ attached to $E_1$;

$P_1$, $P_2$, $P_3$, $P_4$ are each independently absent, —O—, —S—, —SO—, —CO—, —$SO_2$—, —NH—, $NR_2$—, or —$R_3$—;

$R_2$ is $C_{1\text{-}25}$ alkyl, $C_{1\text{-}25}$ aryl, or $C_{1\text{-}25}$ arylene;

$R_3$ is $C_{1\text{-}25}$ alkylene, $C_{1\text{-}25}$ perfluoroalkylene, perfluoroalkyl ether, alkylether, or $C_{1\text{-}25}$ arylene;

$R_4$ is trifluoromethyl, $C_{1\text{-}25}$ alkyl, $C_{1\text{-}25}$ perfluoroalkylene, $C_{1\text{-}25}$ aryl, or another $E_1$ group; and $Q_1$, $Q_2$ are each independently a fluorinated cyclobutyl moiety.

In one refinement, d is equal to the number of aromatic rings in $E_1$. In another refinement, each aromatic ring in $E_1$ can have 0, 1, 2, 3, or 4 $Z_1$ groups.

In another variation of the present embodiment, the ion-conducting polymer comprises segments 4 and 5:

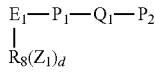  (4)

$E_2\text{-}P_3\text{-}Q_2\text{-}P_4$  (5)

wherein:

$Z_1$ is absent or a protogenic group such as $-SO_2X$, $-PO_3H_2$, $-COX$, and the like;

$E_1$, $E_2$ are each independently an aromatic-containing and/or aliphatic-containing moiety;

X is an $-OH$, a halogen, an ester, or

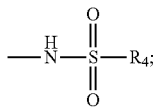

d is the number of $Z_1$ attached to $R_8$;

$P_1$, $P_2$, $P_3$, $P_4$ are each independently absent, $-O-$, $-S-$, $-SO-$, $-CO-$, $-SO_2-$, $-NH-$, $NR_{2-5}$ or $-R_3-$;

$R_2$ is $C_{1-25}$ alkyl, $C_{1-25}$ aryl, or $C_{1-25}$ arylene;

$R_3$ is $C_{1-25}$ alkylene, $C_{1-25}$ perfluoroalkylene, perfluoroalkyl ether, alkylether, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group;

$R_8(Z_1)_d$ is a moiety having d number of protogenic groups; and $Q_1$, $Q_2$ are each independently a fluorinated cyclobutyl moiety.

In a refinement of this variation, $R_8$ is $C_{1-25}$ alkylene, $C_{1-25}$ perfluoroalkylene, perfluoroalkyl ether, alkylether, or $C_{1-25}$ arylene. In one refinement, d is equal to the number of aromatic rings in $R_8$. In another refinement, each aromatic ring in $R_8$ can have 0, 1, 2, 3, or 4 $Z_1$ groups. In still another refinement, d is an integer from 1 to 4 on average.

In another variation of the present embodiment, the ion-conducting polymer having perfluorocyclobutyl moieties comprises polymer segments 6 and 7:

$E_1(SO_2X)_d\text{—}P_1\text{-}Q_1\text{-}P_2$  (6)

$E_2\text{-}P_3\text{-}Q_2\text{-}P_4$  (7)

connected by a linking group $L_1$ to form polymer units 8 and 9:

$+E_2\text{-}P_3\text{-}Q_2\text{-}P_4+_jL_1+E_1(SO_2X)_d\text{—}P_1\text{-}Q_1\text{-}P_2+_i$  (8)

$+E_1(Z_1)_d\text{—}P_1\text{-}Q_1\text{-}P_2+_iL_1+E_2\text{-}P_3\text{-}Q_2\text{-}P_4+_j$  (9)

wherein:

$Z_1$ is absent or a protogenic group such as $-SO_2X$, $-PO_3H_2$, $-COX$, and the like;

$E_1$ is an aromatic-containing moiety;

$E_2$ is an unsulfonated aromatic-containing and/or aliphatic-containing moiety;

$L_1$ is a linking group;

X is an $-OH$, a halogen, an ester, or

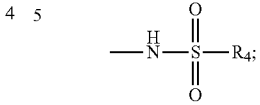

d is a number of $Z_1$ functional groups attached to $E_1$;

$P_1$, $P_2$, $P_3$, $P_4$ are each independently absent, $-O-$, $-S-$, $-SO-$, $-SO_2-$, $-CO-$, $-NH-$, $NR_2-$, $-R_3-$, and $R_2$ is $C_{1-25}$ alkyl, $C_{1-25}$ aryl, or $C_{1-25}$ arylene;

$R_3$ is $C_{1-25}$ alkylene, $C_{1-25}$ perfluoroalkylene, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group;

$Q_1$, $Q_2$ are each independently a fluorinated cyclobutyl moiety;

i is a number representing the repetition of polymer segment 6 with i typically being from 1 to 200; and j is a number representing the repetition of a polymer segment 7 with j typically being from 1 to 200. In one refinement, d is equal to the number of aromatic rings in $E_1$. In another refinement, each aromatic ring in $E_1$ can have 0, 1, 2, 3, or 4 $Z_1$ groups.

In still another variation of the present embodiment, the ion-conducting polymer having perfluorocyclobutyl moieties includes polymer segments 10 and 11:

$E_1(Z_1)_d\text{—}P_1\text{-}Q_1\text{-}P_2$  (10)

$E_2(Z_1)_f\text{—}P_3$  (11)

wherein:

$Z_1$ is absent or a protogenic group such as $-SO_2X$, $-PO_3H_2$, $-COX$, and the like;

$E_1$, $E_2$ are each independently an aromatic or aliphatic-containing moiety wherein at least one of $E_1$ and $E_2$ includes an aromatic containing moiety substituted with $Z_1$;

X is an $-OH$, a halogen, an ester, or

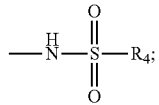

d is the number of $Z_1$ functional groups attached to $E_1$;

f is the number of $Z_1$ functional groups attached to $E_2$;

$P_1$, $P_2$, $P_3$ are each independently absent, $-O-$, $-S-$, $-SO-$, $-SO_2-$, $-CO-$, $-NH-$, $NR_2-$, or $-R_3-$;

$R_2$ is $C_{1-25}$ alkyl, $C_{1-25}$ aryl, or $C_{1-25}$ arylene;

$R_3$ is $C_{1-25}$ alkylene, $C_{1-25}$ perfluoroalkylene, perfluoroalkyl ether, alkyl ether, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group; and $Q_1$ is a fluorinated cyclobutyl moiety, with the proviso that when d is greater than zero, f is zero and when f is greater than zero, d is zero. In one refinement, d is equal to the number of aromatic rings in $E_1$. In another refinement, each aromatic ring in $E_1$ can have 0, 1, 2, 3, or 4 $Z_1$ groups. In still another refinement, d is an integer from 1 to 4 on average. In one refinement, f is equal to the number of aromatic rings in $E_2$. In another refinement, each aromatic ring in $E_2$ can have 0, 1, 2, 3, or 4 $Z_1$ groups. In still another refinement, f is an integer from 1 to 4 on average. In a variation, polymer segments 10 and 11 are each independently repeated 1 to 10,000 times to form respective polymer blocks that may be joined with a linking group $L_1$ shown below.

In another variation of the present embodiment, the ion-conducting polymer comprises:

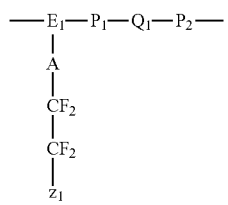
(12)

wherein:
$Z_1$ is hydrogen or a protogenic group such as —$SO_2X$, —$PO_3H_2$, —COX, and the like;
$E_1$ is an aromatic containing moiety;
A is absent or oxygen (O) or a chain extender having a carbon backbone;
X is an —OH, a halogen, an ester, or

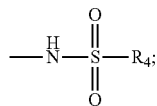

$P_1$, $P_2$ are each independently absent, —O—, —S—, —SO—, —$SO_2$—, —CO—, —NH—, $NR_2$—, or —$R_3$—, and
$R_2$ is $C_{1-25}$ alkyl, $C_{1-25}$ aryl, or $C_{1-25}$ arylene;
$R_3$ is $C_{1-25}$ alkylene, $C_{1-25}$ perfluoroalkylene, or $C_{1-25}$ arylene;
$R_4$ is trifluoromethyl, $C_{1-25}$ alkyl, $C_{1-25}$ perfluoroalkylene, $C_{1-25}$ aryl, or another $E_1$ group; and
$Q_1$ is a fluorinated cyclobutyl moiety.

In a variation of the present embodiment, polymer segment 12 is repeated j times to form a polymer block described by formula 13.

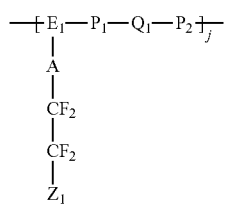
(13)

In a refinement, j is from about 1 to about 10,000. In another refinement, j is from about 2 to about 100. In another refinement, j is from about 3 to about 50. In still another refinement, j is from about 4 to about 40.

In a variation of the present invention, the polymer having polymer segment 1 includes a second polymer segment having formula 14:

$$E_2\text{-}P_3\text{-}Q_2\text{-}P_4 \qquad (14)$$

wherein:
$E_2$ is an aromatic containing moiety;
$P_3$, $P_4$ are each independently absent, —O—, —S—, —SO—, —$SO_2$—, —CO—, —NH—, $NR_2$—, or —$R_3$—, and
$R_2$ is $C_{1-25}$ alkyl, $C_{1-25}$ aryl, or $C_{1-25}$ arylene;
$R_3$ is $C_{1-25}$ alkylene, $C_{1-25}$ perfluoroalkylene, or $C_{1-25}$ arylene;
$R_4$ is trifluoromethyl, $C_{1-25}$ alkyl, $C_{1-25}$ perfluoroalkylene, $C_{1-25}$ aryl, or another $E_2$ group; and
$Q_2$ is a fluorinated cyclobutyl moiety.

In a refinement, polymer segment 14 is repeated k times to form polymer block 15:

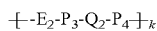
(15)

In a refinement, k is from about 1 to about 10,000. In another refinement, k is from about 2 to about 100. In another refinement, k is from about 3 to about 50. In still another refinement, k is from about 4 to about 40.

In another variation, polymer blocks 13 and 15 are connected by a linking group $L_1$:

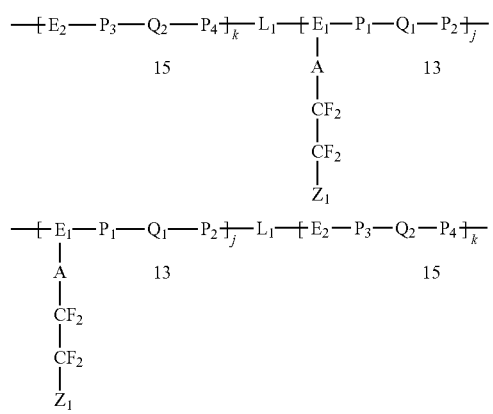

Examples for $Q_1$ and $Q_2$ in the above formulae are:

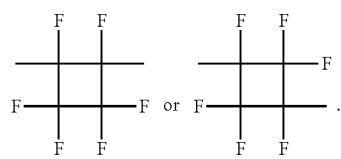

In each of the formulae 1-15, $E_1$ and $E_2$ include one or more aromatic rings. For example, $E_1$ and $E_2$, include one or more of the following moieties:

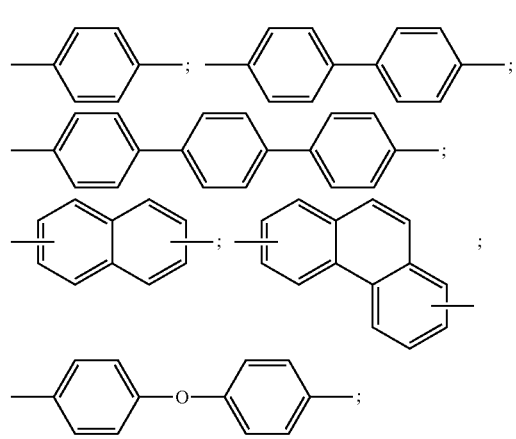

-continued
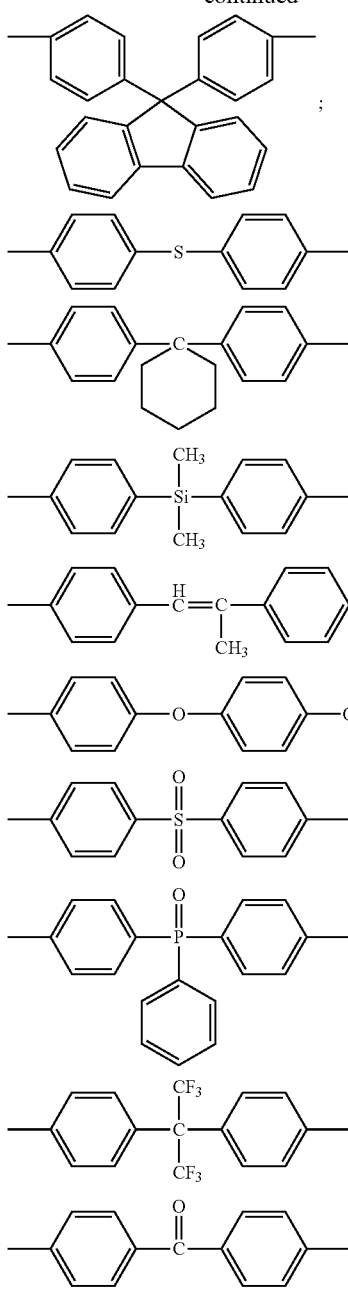
Examples of $L_1$ include the following linking groups:
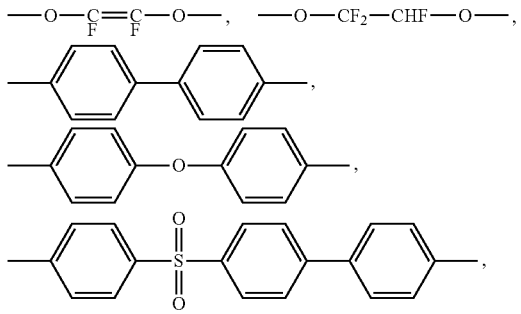
-continued
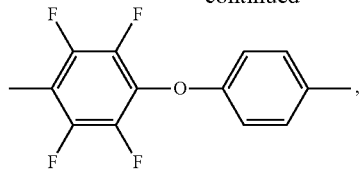
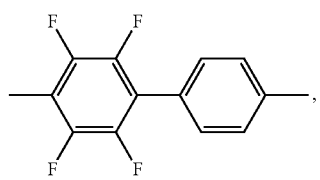
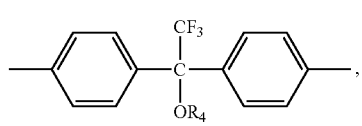
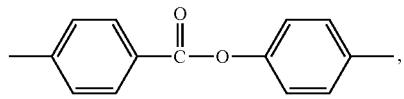
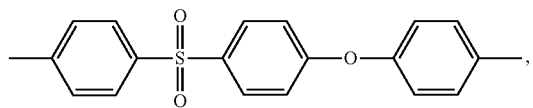
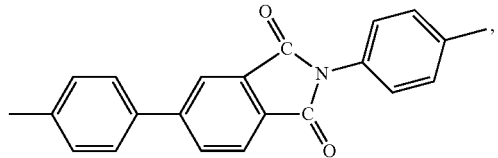
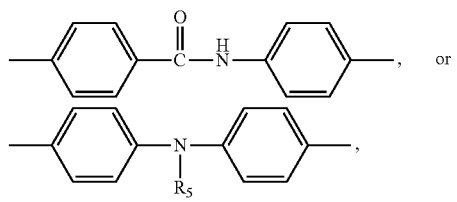
where $R_5$ is an organic group, such as an alkyl or acyl group.
With regards to new PFCB moiety structures for membranes, high free volume PFCB ionomers with the following $E_1$ and $E_2$ are relevant as derived from the following PFCB "monomers":
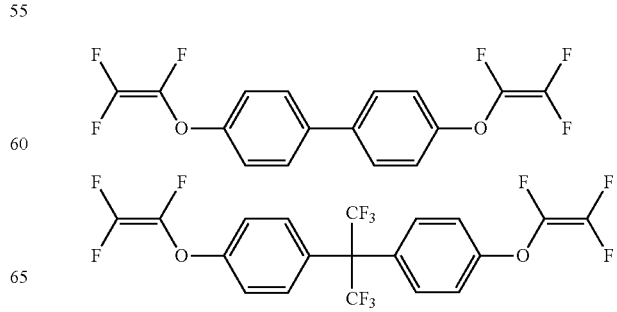

-continued

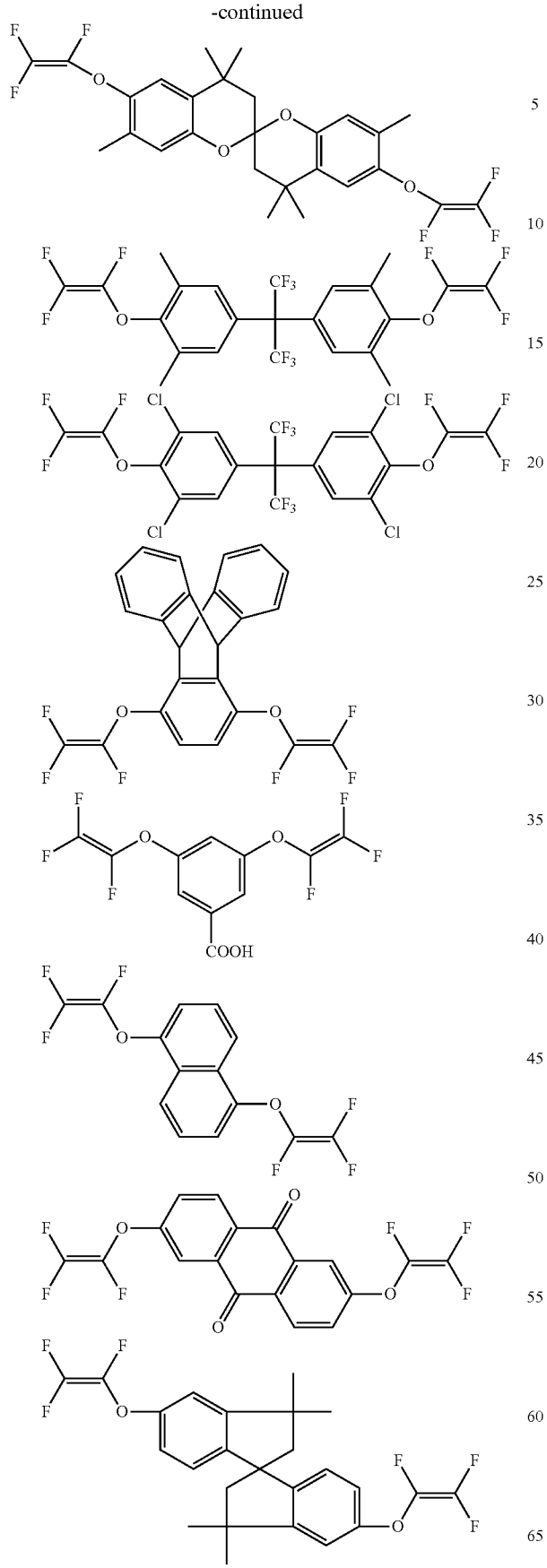

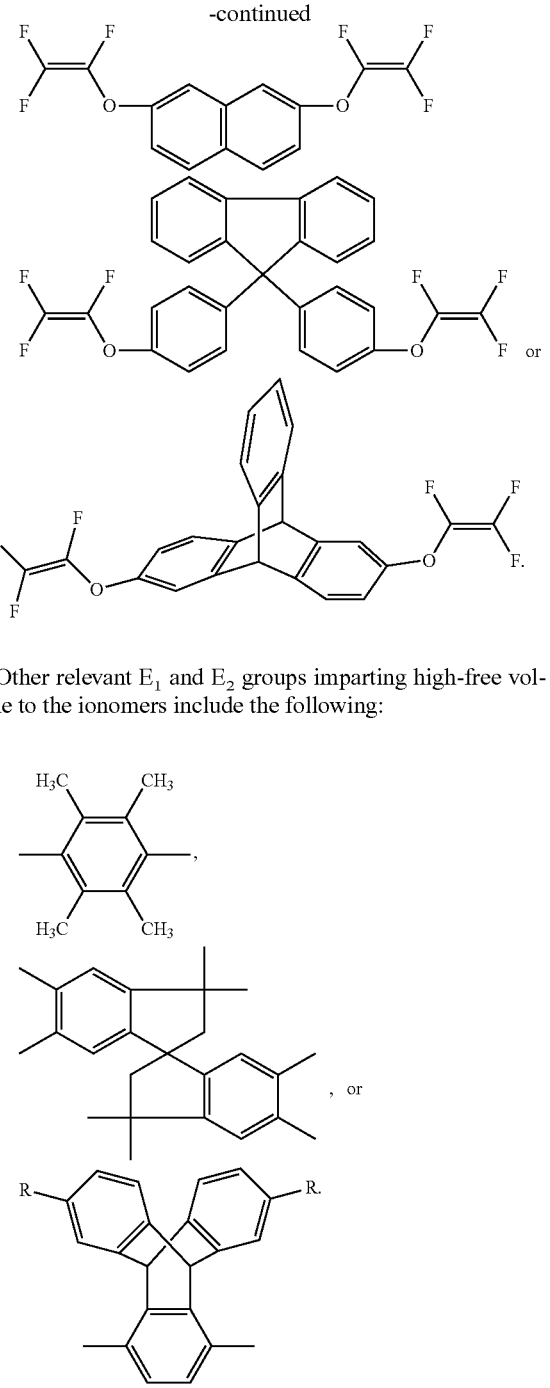

Other relevant $E_1$ and $E_2$ groups imparting high-free volume to the ionomers include the following:

In another variation of the present invention, the perfluorocyclobutyl-containing layer(s) further includes a fluoroelastomer. In a refinement, such layers include from about 5 weight percent to about 40 weight percent fluoroelastomer and about 60 weight percent to about 95 weight percent PFCB polymers. The fluoroelastomer may be any elastomeric material comprising fluorine atoms. The fluoroelastomer may comprise a fluoropolymer having a glass transition temperature below about 25° C. or preferably, below 0° C. The fluoroelastomer may exhibit an elongation at break in a tensile mode of at least 50% or preferably at least 100% at room temperature. The fluoroelastomer is generally hydrophobic and substantially free of ionic groups. The fluoroelastomer may be prepared by polymerizing at least one fluoromonomer such as vinylidene fluoride, tetrafluoroethylene, hexafluoropropylene, vinylfluoride, vinylchloride, chlorotrifluoroethylene, perfluoromethylvinyl ether, and trifluoroethylene. The fluoroelastomer may also be prepared by copolymerizing at least one fluoromonomer and at least one non-fluoromonomer such as ethylene, propylene, methyl methacrylate, ethyl acrylate, styrene and the like. The fluoroelastomer may be prepared by free radical polymerization or anionic polymerization in bulk, emulsion, suspension and solution.

Examples of fluoro elastomers include poly(tetrafluoroethylene-co-ethylene), poly(vinylidene fluoride-co-hexafluoropropylene), poly(tetrafluoroethylene-co-propylene), terpolymer of vinylidene fluoride, hexafluoropropylene and tetrafluoroethylene, and terpolymer of ethylene, tetrafluoroethylene and perfluoromethylvinylether. Some of the fluoroelastomers are commercially available from Arkema under trade name Kynar Flex® and Solvay Solexis under the trade names Solef® and Technoflon®, from 3M under the trade name Dyneon®, and from DuPont under the trade name Viton®. For example, Kynar Flex 2751 is a useful copolymer of vinylidene fluoride and hexafluoropropylene with a melting temperature between about 130° C. and 140° C. The glass transition temperature of Kynar Flex 2751 is about −40 to −44° C. The fluoroelastomer may further comprise a curing agent to allow crosslinking reactions after being blended with an ion-conducting polymer that includes a perfluorocyclobutyl moiety.

The following examples illustrate the various embodiments of the present invention. Those skilled in the art will recognize many variations that are within the spirit of the present invention and scope of the claims.

Example 1

PFCB with PFSA Skins, 3-Layers, Coated all Together (AT)

Figure 5:
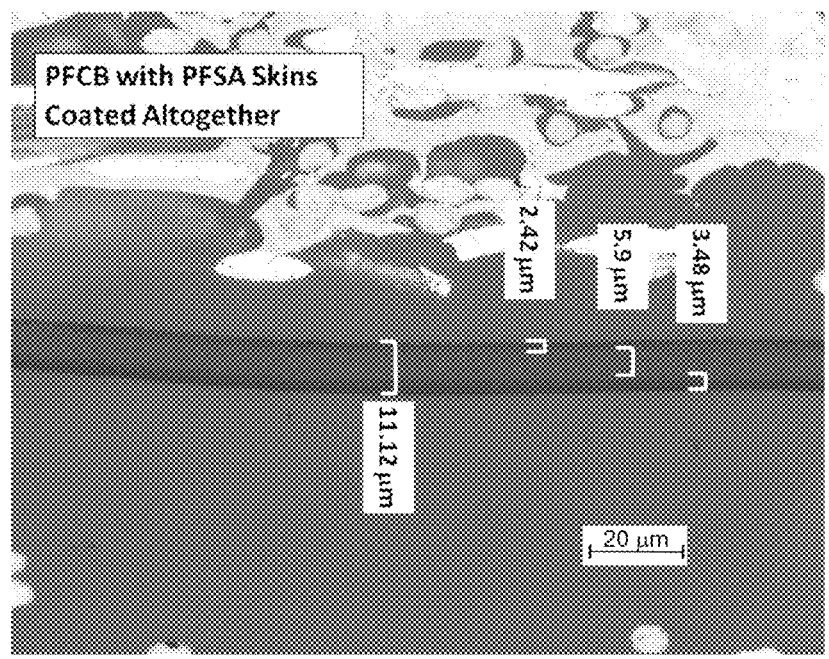
FIG. 5 is an optical image of a membrane having a PFCB-containing layer with two PFSA skins.

FIG. 5 is an optical image of a membrane having a PFCB-containing layer with two PFSA skins. With reference to FIG. 5, from the bottom to the top are Nafion® (DE2020) (1.48-μm thick) coated from a 20 wt % DMAc solution, perfluorocyclobutane (PFCB) (5.9-μm thick) coated from an 11 wt % DMAc (N,N-dimethylacetamide) solution and Nafion® (DE2020) (2.42 μm-thick) coated from a 20 wt % DMAc solution, respectively. The total membrane thickness is about 10-12-μm thick. The coating details are as follows:
1) An Erichsen coater is set at 40 degrees C. with a clean glass plate or a piece of fluorinated ethylene-propylene (FEP)-coated polyimide backer film sheet as the substrate on top of the vacuum platen.
2) A set of coating Bird applicators is placed in the following order: one, 3-mil (10" coating width) applicator with masking tape shims, one, 3-mil (9" coating width) applicator with shims of Mylar (32 mm-thick) tape, and one, 1-mil (9" coating width) applicator, all arranged in order from left to right to coat the top, middle and bottom film layers. The coating speed is set at 12.5 mm/s and the coating direction is from left to the right.
3) The coated film is heated to 80 degrees C. to dryness, then baked in the oven at 80 degree C. for another hour and then annealed at 140 degrees C. for 4 hours.

Example 2

PFCB with PFSA Skins, 3-Layers Coated Layer by Layer (LBL)

Figure 6:
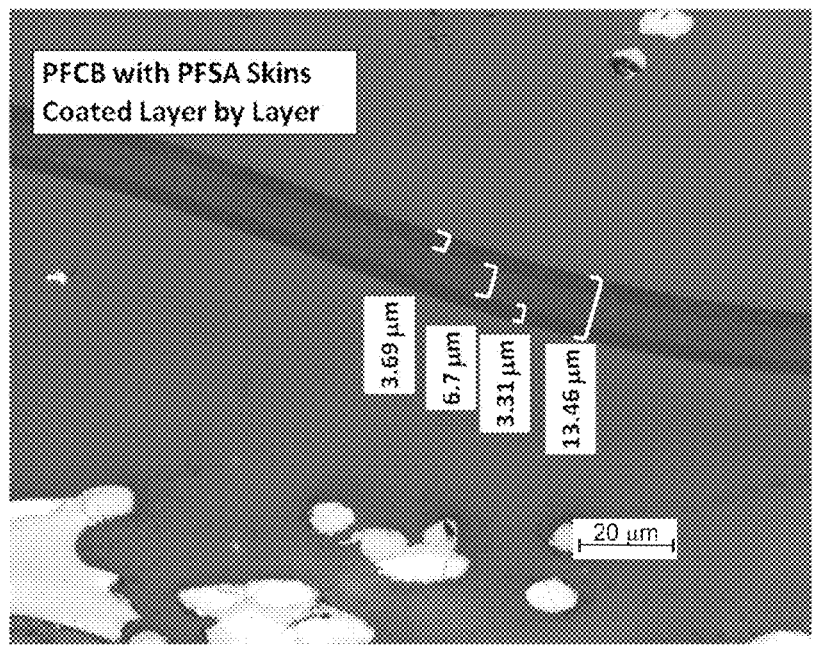
FIG. 6 is an optical image of a membrane having a PFCB-containing layer with two PFSA skins.

FIG. 6 provides an optical image of a membrane having a PFCB-containing layer with two PFSA skins. With reference to FIG. 6, from the bottom to the top are Nafion® (DE2020) (3.31-μm thick) coated from a 20 wt % DMAc solution, perfluorocyclobutane (PFCB) (6.7-μm thick) coated from an 11 wt % DMAc solution and Nafion® (DE2020) (3.6-μm thick) coated from a 20 wt % DMAc solution respectively. The total membrane thickness is about 13-14-μm thick. The coating details are as follows:
1) The coater is set at 40 degrees C. with a clean glass plate or a piece of fluorinated ethylene-propylene (FEP)-coated polyimide backer film sheet as the substrate on top of the vacuum platen. The coating speed is set at 12.5 mm/s and the coating direction is from left to the right.
2) The $1^{st}$ layer of Nafion® (DE2020) is coated with a 1-mil Bird applicator (8" coating width) and then dried at 40 degrees C.;
3) The $2^{nd}$ layer of PFCB ionomer layer is coated with a 3-mil Bird applicator (9" coating width) and then dried at 40 degrees C.;
4) The top layer of Nafion® (DE2020) is coated with a 1-mil (10" coating width) Bird applicator and then heated to 80 degrees C. to dryness;
5) The film is then heat-annealed at 140 degrees C. for 4 hours.

Example 3

Figure 7:
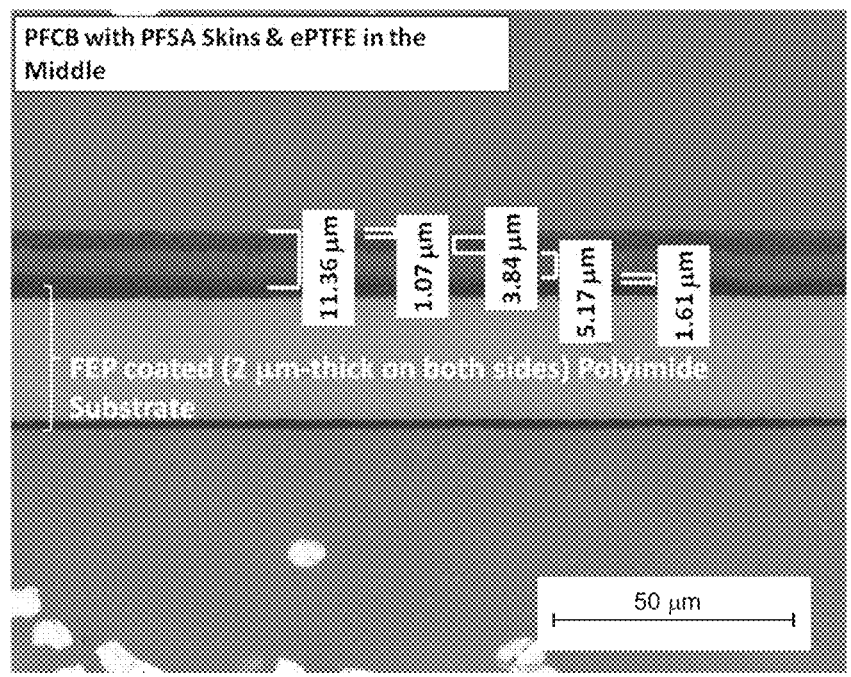
FIG. 7 is an optical image of a membrane having a PFCB-containing layer with two PFSA skins and a support layer in the middle.

PFCB with PFSA Skins, Coated Layer by Layer (LBL) with an ePTFE Support in the Middle FIG. 7 provides an optical image of a membrane having a PFCB-containing layer with two PFSA skins and an ePTFE (expanded polytetrafluoroethylene) support layer. The coating substrate used in this example is a 26-μm-thick polyimde film with a 2-μm thick fluorinated ethylene-propylene (FEP) surface coating on both sides (the total backer film thickness is 30 μm). With reference to FIG. 7, from the bottom to the top, are Nafion® (DE2020) (1.61-μm thick) coated from a 10 wt % isopropanol (IPA) solution, perfluorocyclobutane (PFCB) (5.17-μm thick) coated from a 7 wt % DMAc solution, then a film (3.84-μm thick) with an ionomer-filled expanded polytetrafluoroethylene (ePTFE) support layer and Nafion® (DE2020) (1.07-μm thick) coated from a 5 wt % isopropanol solution, respectively. The total membrane thickness is about 12-μm thick. The coating details are as follows:
1) The coater is set at room temperature with a piece of fluorinated ethylene-propylene (FEP)-coated polyimide film sheet as the substrate on top of the vacuum platen. The coating speed is set at 12.5 mm/s and the coating direction is from left to the right;
2) The ePTFE is pretreated with a 1 wt % Nafion® DE2020 solution in isopropanol at room temperature using a 3-mil (10" coating width) Bird applicator;
3) The $1^{st}$ layer of Nafion® (DE2020) is coated using a 1-mil Bird applicator (10" coating width) and then dried at room temperature;
4) The $2^{nd}$ layer of PFCB ionomer layer is coated with a 3-mil Bird applicator (10" coating width) with Mylar (32 μm-thick) tape shims and then overlaid with the pretreated ePTFE support with the shiny side down on top of the coating, which is then heated to 80 degrees C. to dryness and then cooled back down to room temperature;
5) The edges of the ePTFE are taped down with Mylar (32 μm-thick) adhesive strips and the top layer of Nafion® DE2020 is coated with a 1 mil (10" coating width) Bird applicator, then heated to 50 degrees C. to dryness, then heated to 80 degrees C. for an hour and then annealed at 140 degrees C. for 4 hours.

Example 4

PFSA and PFCB, 2-Layers Coated all Together with ePTFE on the Top

Figure 8:
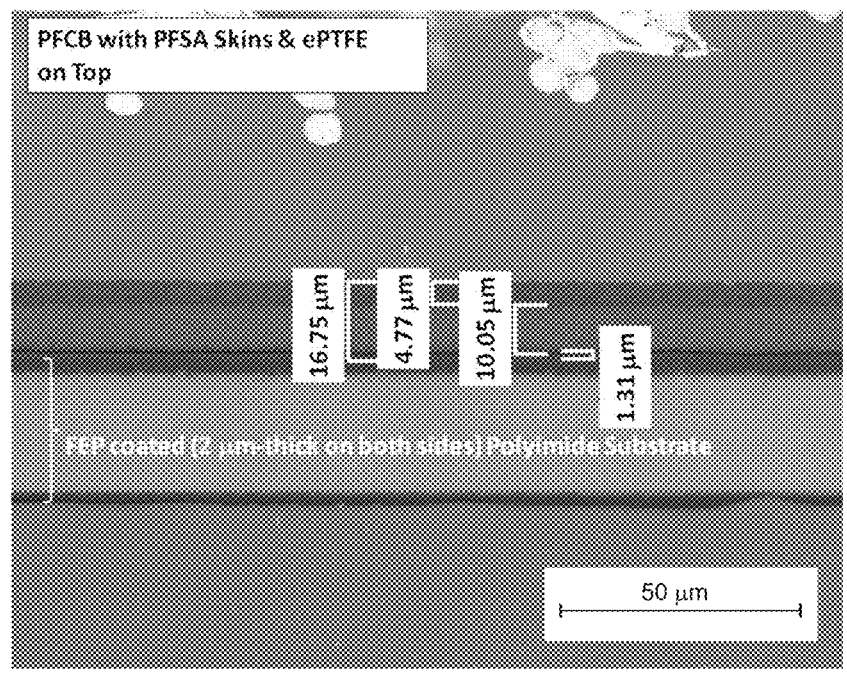
FIG. 8 is an optical image of a membrane having a PFCB-containing layer with two PFSA skins and a support layer on the top.

FIG. 8 provides an optical image of a membrane having a PFSA-containing layer with two PFCB layers and an ePTFE support layer. The coating substrate used in this example is a 26 μm-thick polyimide film with 2-μm-thick fluorinated ethylene-propylene (FEP) surface coating on both sides (the total backer thickness is 30 μm). With reference to FIG. 8, from the bottom to the top, are Nafion® (DE2020) (1.31-μm thick) coated from a 10 wt % DMAc solution, perfluorocyclobutane (PFCB) (10.05-μm thick) coated from a 7 wt % DMAc solution, and an expanded polytetrafluoroethylene (ePTFE) film (4.77-μm thick). The total membrane thickness is about 16.75 μm thick. The coating details are as follows:
1) The coater is set at room temperature with a piece of fluorinated ethylene-propylene (FEP)-coated polyimide film sheet as the substrate on top of the vacuum platen. The coating speed is set at 12.5 mm/s and the coating direction is from left to the right;
2) The ePTFE is pretreated with a 5 wt % Nafion® DE2020 solution in isopropanol at room temperature using a 1 mil (10" coating width) Bird applicator with Mylar (32 μm-thick) tape shims;
3) The bottom Nafion® DE2020 layer and the PFCB layer next to it are coated all together using two Bird applicators: one with a 10" coating width and a 3-mil gap adjusted with Mylar (32 μm-thick) tape shims and another with a 1-mil gap and a 10" coating width. The applicators are arranged from left to right, and the bottom Nafion® solution is placed in front of the 1 mil Bird applicator and the PFCB solution is placed in front of the 3-mil Bird applicator. The wet coated layers are then overlaid with the pretreated ePTFE support with the shiny side up. The composite is then heated to 80 degrees C. to dryness and then annealed at 140 degree C. for 4 hours.

Example 5

Figure 9:
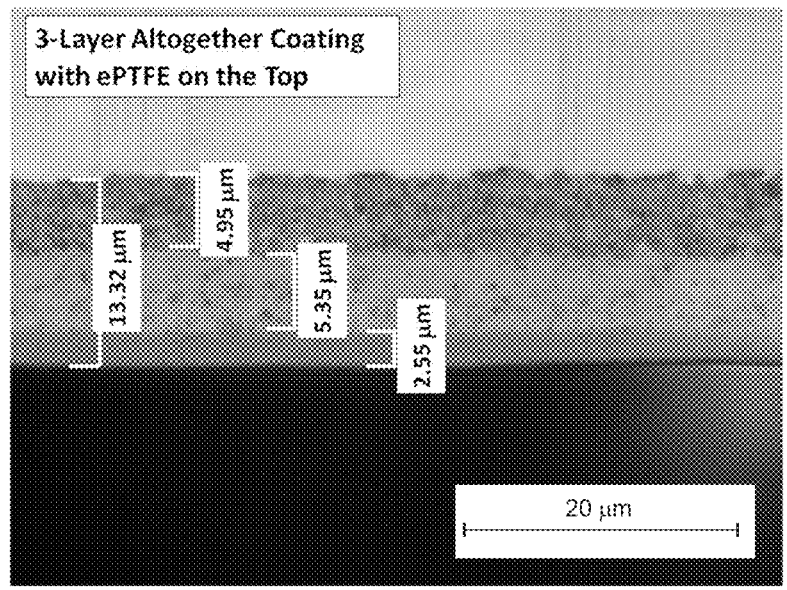
FIG. 9 is an optical image of a membrane with a PFCB-containing layer with two PFSA skin layers and a support layer on the top.

PFCB with PFSA Skins, 3-Layers Coated all Together with an ePTFE Support on the Top FIG. 9 provides an optical image of a membrane with a PFCB-containing layer with three PFSA skin layers and an ePTFE support layer. The coating substrate used in this example is a 26-μm thick polyimide film with 2-μm-thick fluorinated ethylene-propylene (FEP) surface coating on both sides (the total backer thickness is 30 μm). In the above optical image, from the bottom to the top, are Nafion® (DE2020) (2.55-μm thick) coated from a 10 wt % DMAc solution, perfluorocyclobutane (PFCB) (5.35-μm thick) coated from a 7 wt % DMAc solution, and Nafion® (DE2020) coated from a 10 wt % DMAc solution with an ePTFE film at 4.55 μm-thick. The total membrane thickness is about 13-μm thick. The coating details are as follows:
1) The coater is set at room temperature with a piece of fluorinated ethylene-propylene (FEP)-coated polyimide film sheet as the substrate on top of the vacuum platen. The coating speed is set at 12.5 mm/s and the coating direction is from left to the right;
2) The ePTFE support is pretreated with a 1 wt % Nafion® DE2020 solution in isopropanol at room temperature using a 3-mil (10" coating width) Bird applicator;
3) Three Bird applicators are placed in order. A 3-mil applicator (10" coating width) with masking tape shims, a 3-mil applicator (9" coating width) with Mylar (32 μm-thick) tape shims, and 1-mil applicator (10" coating width), arranged from left to right. The bottom Nafion® solution is placed in front of the 1-mil Bird applicator and the PFCB solution is placed in front of the middle 3-mil Bird applicator, and the top Nafion® DE2020 solution is placed in front of the most left Bird applicator. The Bird applicators are separated by spacers (0.5-inch diameter stainless steel, hexagonal screw nuts) and the coatings are cast all together, and then overlaid with the pretreated ePTFE support with the shiny side down. The composite is then heated to 80 degrees C. to dryness, and then annealed at 140 degrees C. for 4 hours.

Example 6

PFCB Double-Layer Coating with ePTFE in the Middle

Figure 10:
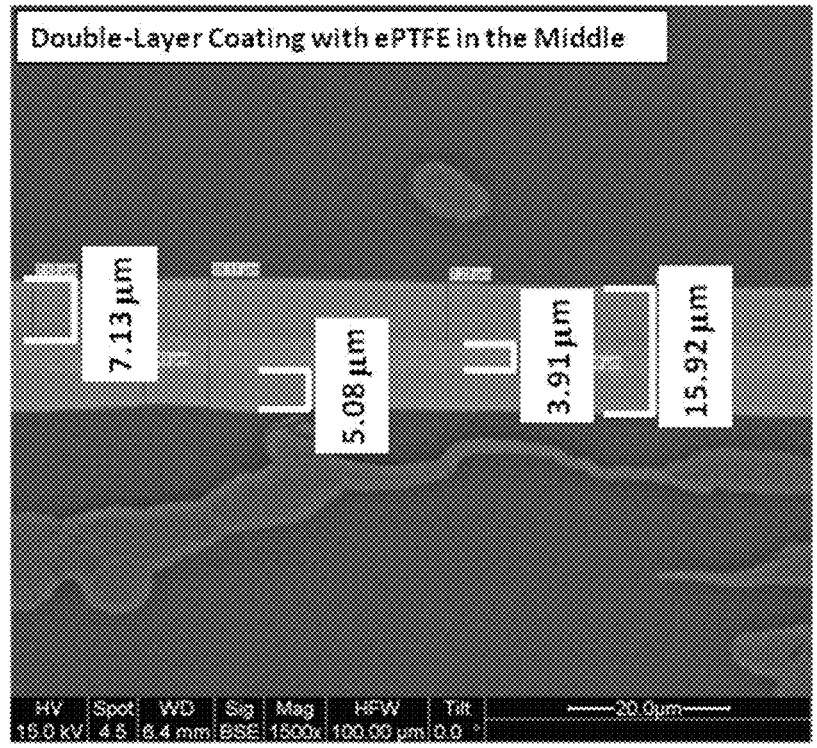
FIG. 10 is an SEM image of a membrane having two PFCB-containing layers and a support layer in the middle.

FIG. 10 provides a scanning electron microscope (SEM) image of a membrane having two PFCB-containing layers and an ePTFE support layer. The coating substrate used in this example is a 26-μm thick polyimide film with 2-μm thick fluorinated ethylene-propylene (FEP) surface coating on both sides (the total backer film thickness is 30 μm). With reference to FIG. 10, from the bottom to the top are the PFCB layer (4.8 μm-thick) coated from a 7 wt % DMAc solution at the bottom, an ePTFE layer at 3.9-μm thick in the middle, and PFCB (7.18-μm thick) coated from a 7 wt % DMAc solution on the top. The total membrane thickness is about 16-μm thick. The coating details are as follows:
1) The coater is set at room temperature with a piece of fluorinated ethylene-propylene (FEP)-coated polyimide film sheet as the substrate on top of the vacuum platen. The coating speed is set at 12.5 mm/s and the coating direction is from left to the right;
2) The ePTFE is pretreated with a 1 wt % Nafion® DE2020 solution in isopropanol at room temperature using a 3-mil (10" coating width) Bird applicator;
3) The 1$^{st}$ layer of PFCB layer is coated with a 3-mil (10" coating width) Bird applicator, then is overlaid with the pretreated ePTFE support and then heated to 80 degrees C. to dryness;
4) After cooling back down to room temperature, the ePTFE edges are taped down with 32-μm thick Mylar (32 μm-thick) strips, and then the top PFCB layer is applied using a 3-mil (10" coating width) Bird applicator. The composite is then heated to 80 degrees C. to dryness;
5) The film is then annealed at 140 degrees C. for 4 hours.

Example 7

PFCB Single-Layer Coating with an ePTFE Support on the Top

Figure 11:
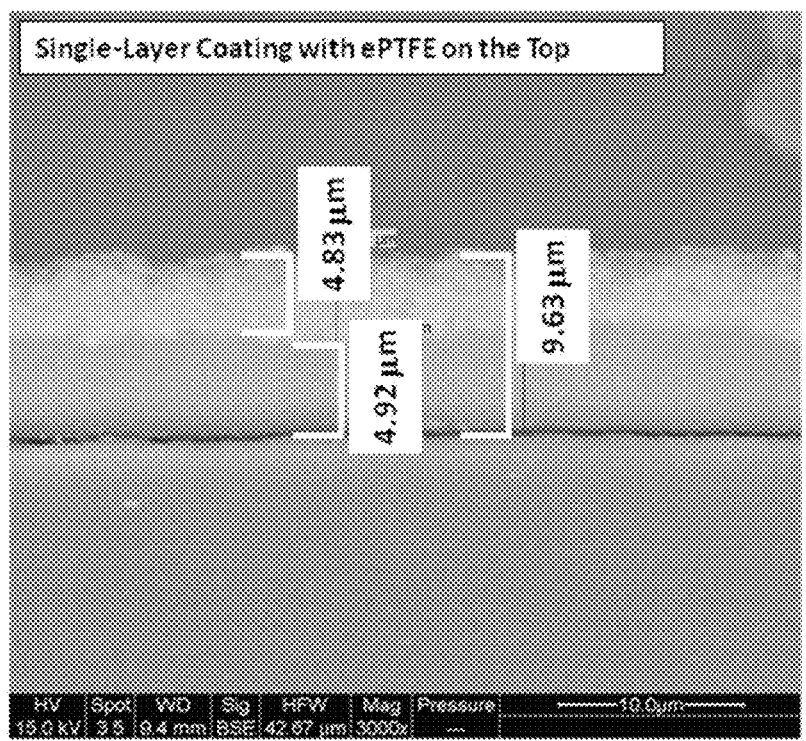
FIG. 11 is an SEM image of a membrane having a PFCB-containing layer and a support layer.

FIG. 11 provides an SEM image of a membrane having a PFCB-containing layer and an ePTFE support layer. The coating substrate used in this example is a 26-μm-thick polyimde film with 2-μm-thick fluorinated ethylene-propylene (FEP) surface coating on both sides (the total backer thickness is 30 μm). In the SEM image, from the bottom to the top, are a PFCB layer (4.92-μm thick) coated from a 7 wt % DMAc solution (at the bottom), and an ePTFE support layer at 4.83-μm thick (on the top). The total membrane thickness is about 9.63-μm thick. The coating details are as follows:
1) The coater is set at room temperature with a piece of fluorinated ethylene-propylene (FEP)-coated polyimide film sheet as the substrate on top of the coating platen. The coating speed is set at 12.5 mm/s and the coating direction is from left to the right;
2) The ePTFE is pretreated with a 1 wt % Nafion® DE2020 solution in isopropanol at room temperature using 3-mil (10" coating width) Bird applicator;
3) The $1^{st}$ PFCB layer is coated with a 3-mil (10" coating width) Bird applicator, then is overlaid with a pretreated ePTFE support, and then the composite is heated to 80 degrees C. to dryness;
4) The film is then annealed at 140 degrees C. for 4 hours.

Figure 12:
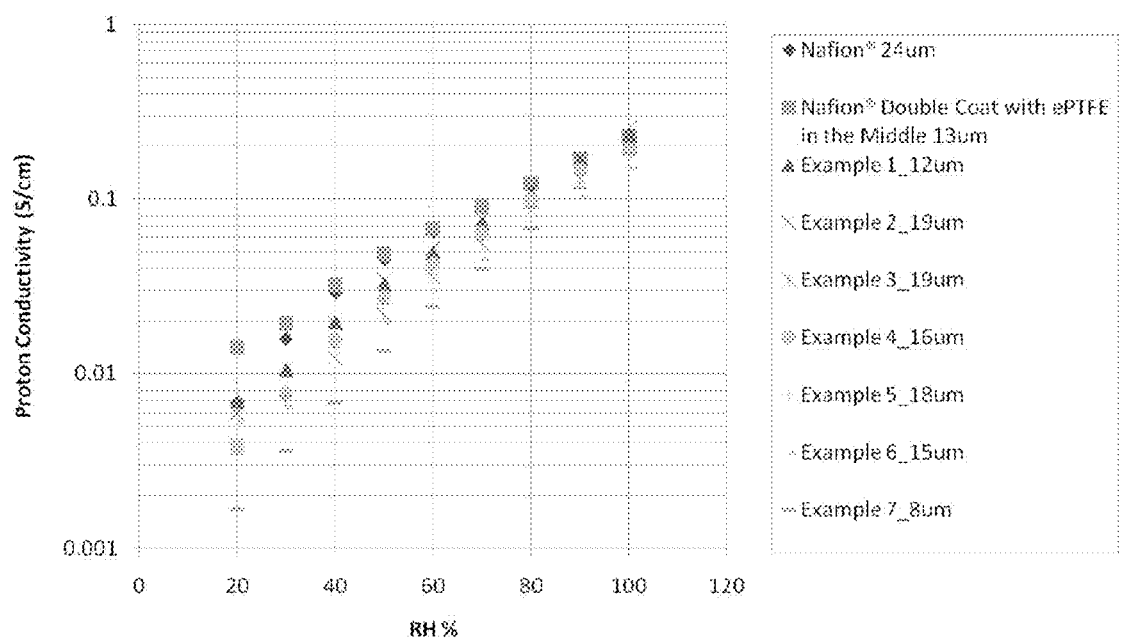
FIG. 12 shows the in-plane proton conductivity of multi-layer-architecture-membrane samples under different relative humidities compared with Nafion® with and without ePTFE as the baseline.

FIG. 12 shows the in-plane proton conductivity of multilayer-architecture-membrane samples under different relative humidities compared with Nafion®, with and without an ePTFE support as the baseline. The PFCB single-layer coating with an ePTFE support on the top (Example 7) shows the lowest proton conductivity of all those architectures, and the PFCB double-layer coating with an ePTFE support in the middle (Example 6) shows slightly higher proton conductivity. The PFCB with PFSA skins on both sides (Examples 1 and 2), whether coated all together or layer-by-layer, show the closest proton conductivity to the Nafion® baseline.

Figure 13:
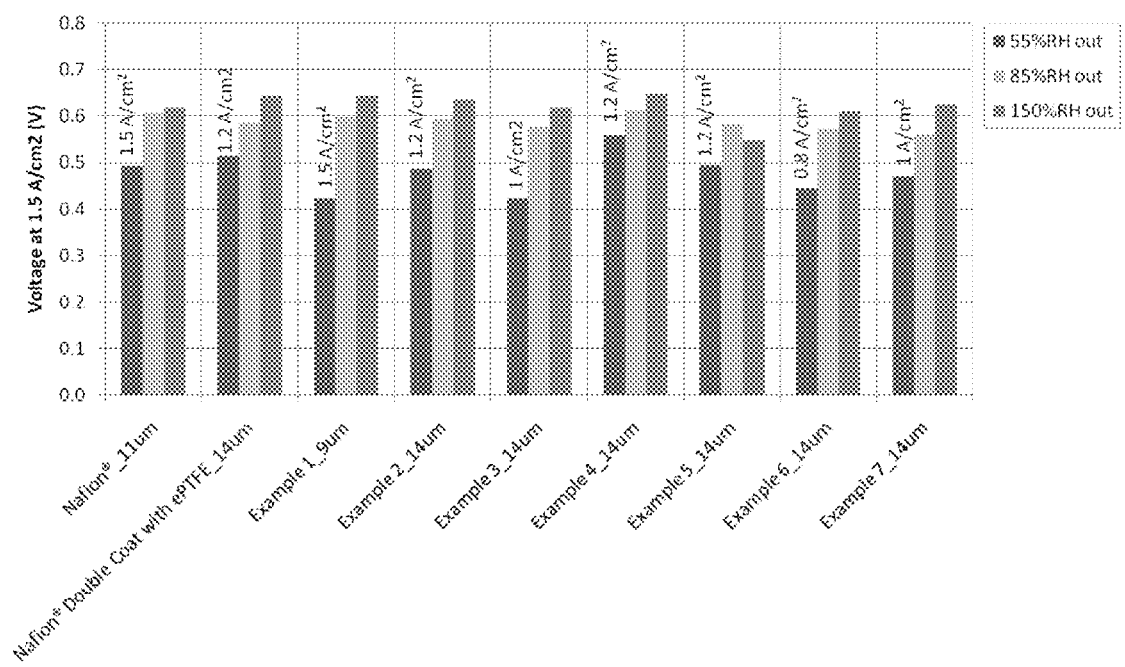
FIG. 13 shows the cell voltage of different multilayer architecture membranes at current density of 1.5 A/cm² for the relative humidity gas outlet streams at 85% and 150% and under 55% gas outlet relative humidity.

The fuel cell performance data of multilayer architecture membranes are listed in Table 1 and are plotted in FIG. 13 in comparison with a Nafion® baseline.

TABLE 1

Cell voltages at 55% RH, 85% RH and 150% RH at their maximum current density as determined with 50-cm² hardware, fuel cell performance tests.

| Corresponding Example | Voltage @ 55% $RH_{out}$ (V) | Current Density @ 55% $RH_{out}$ (A/cm²) | Voltage @ 85% $RH_{out}$ (V) | Current Density @ 85% $RH_{out}$ (A/cm²) | Voltage @ 150% $RH_{out}$ (V) | Current Density @ 150% $RH_{out}$ (A/cm²) |
|---|---|---|---|---|---|---|
| Nafion ®__11 um | 0.4921 | 1.5 | 0.6070 | 1.5 | 0.6183 | 1.5 |
| Nafion ® Double Coat with ePTFE__14 um | 0.5145 | 1.2 | 0.5861 | 1.5 | 0.6445 | 1.5 |
| Example 1__9 um | 0.4226 | 1.5 | 0.5974 | 1.5 | 0.6435 | 1.5 |
| Example 2__14 um | 0.4862 | 1.2 | 0.5937 | 1.5 | 0.6358 | 1.5 |
| Example 3__14 um | 0.4230 | 1.0 | 0.5787 | 1.5 | 0.6173 | 1.5 |
| Example 4__14 um | 0.5591 | 1.2 | 0.6126 | 1.5 | 0.6472 | 1.5 |
| Example 5__14 um | 0.4948 | 1.2 | 0.5844 | 1.5 | 0.5481 | 1.5 |
| Example 6__14 um | 0.4445 | 0.8 | 0.5730 | 1.5 | 0.6102 | 1.5 |
| Example 7__14 um | 0.4695 | 1.0 | 0.5605 | 1.5 | 0.6250 | 1.5 |

FIG. 13 shows the cell voltages of membranes with different multilayer architectures at a current density of 1.5 A/cm² for the relative humidity gas outlet streams at 85%, 150%, and under 55%. The voltage is only recorded at the maximum current density. Nafion® DE2020 membrane performs to 1.5 A/cm² under all three different relative humidities. However, the Nafion® double-coated membrane with an ePTFE support in the middle operates to 1.2 A/cm² at 55% $RH_{out}$, and this performance hit is due to the non-proton conductive ePTFE support in the membrane. The PFCB membrane performance is more sensitive to humidity especially under dry conditions (55% $RH_{out}$). As shown in FIG. 13, without Nafion® PFSA skins, the PFCB double-coated membrane with an ePTFE support in the middle (Example 6) only operates to 0.8 A/cm², and the PFCB single-coated membrane with an ePTFE support on the top (Example 7) only performs to 1 A/cm². However, the multilayer architecture membranes consisting of PFCB with Nafion® skins all exhibit improved dry performance and are comparable to the Nafion® double-coated membrane with an ePTFE support. The multilayer membrane coated all together (Example 1) exhibits better performance than the ones coated by using the layer by layer method (Example 2). Moreover, the same trend is found with the ePTFE supported membranes, e.g., the multilayer membranes of Examples 4 and 5 (with all layers coated simultaneously), which both exhibit better performance than that of the Example 3 membrane (that is coated layer by layer). The Example 4 membrane exhibits slightly higher performance than that of Example 5, because the Example 4 membrane consists of 2-layers (PFSA/PFCB) which are coated all together with an ePTFE support on the top, and another thin layer of PFSA is coated on top of the ePTFE support. In comparison, Example 5 is a 3-layer (PFSA/PFCB/PFSA) membrane with all layers coated simultaneously with an ePTFE support on the top, without an extra layer of PFSA on top of the ePTFE support.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A multilayer polyelectrolyte membrane for a fuel cell, the membrane comprising:
 a first perfluorocyclobutyl-containing layer comprising a polymer having perfluorocyclobutyl moieties, the first perfluorocyclobutyl-containing layer having a first major side and a second major side, the first perfluorocyclobutyl-containing layer having a thickness from 2 to 8 microns;
 a first perfluorosulfonic acid layer comprising a perfluorosulfonic acid polymer, the first perfluorosulfonic acid layer disposed over the first major side of the first perfluorocyclobutyl-containing layer, the first perfluorosulfonic acid layer having a thickness from 1 to 4 microns;
 a second perfluorosulfonic acid layer comprising a perfluorosulfonic acid polymer, the second perfluorosulfonic acid layer disposed over the second major side of the first perfluorocyclobutyl-containing layer, the second perfluorosulfonic acid layer having a thickness from 1 to 4 microns; and a support contacting at least one of the first perfluorosulfonic acid layer or the second perfluorosulfonic acid layer.

2. The membrane of claim 1 wherein the support is an expanded polytetrafluoroethylene support.

3. The membrane of claim 1 wherein the support is at least partially immersed in the perfluorocyclobutyl-containing layer and/or the first perfluorosulfonic acid layer.

4. The membrane of claim 1 wherein the support is at least partially immersed in the first perfluorosulfonic acid layer.

5. The membrane of claim 1 wherein the support is at least partially immersed in the second perfluorosulfonic acid layer.

6. The membrane of claim 1 wherein the first perfluorocyclobutyl-containing layer further includes a fluoroelastomer.

7. The membrane of claim 1 wherein the perfluorocyclobutyl moieties are:

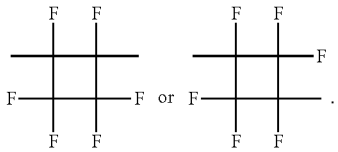

8. The membrane of claim 1 wherein the first perfluorosulfonic acid layer comprises polymer segments 1 and 2:

$$[E_1(SO_2X)_d]-P_1-Q_1-P_2 \qquad 1$$

$$E_2-P_3-Q_2-P_4 \qquad 2$$

wherein:
$E_1(SO_2X)_d$ is a sulfonated aromatic containing moiety;
$E_1$ is an aromatic containing moiety;
$E_2$ is an unsulfonated aromatic-containing and/or aliphatic-containing moiety;
X is an —OH, a halogen, an ester, or

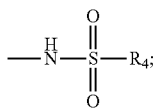

d is the number of $(SO_2X)_d$ attached to $E_1$;
$P_1$, $P_2$, $P_3$, $P_4$ are each independently: absent, —O—, —S—, —SO—, —CO—, —SO$_2$—, —NR$_1$H—, NR$_2$—, or —R$_3$—;
$R_2$ is $C_{1-25}$ alkyl;
$R_3$ is $C_{1-25}$ alkylene, perfluoroalkylene, perfluoroalkyl ether, or alkylether;
$R_4$ is trifluoromethyl, $C_{1-25}$ alkyl, or another $E_1$ group; and
$Q_1$, $Q_2$ are each independently a fluorinated cyclobutyl moiety.

9. The membrane of claim 1 wherein the first perfluorosulfonic acid layer comprises polymer segments 3 and 4:

$$E_1-P_1-Q_1-P_2 \atop | \atop R_8(SO_3X)_d \qquad 3$$

$$E_2-P_3-Q_2-P_4 \qquad 4$$

wherein:
$E_1$, $E_2$ are each independently an aromatic-containing and/or aliphatic-containing moiety;
X is an —OH, a halogen, an ester, or

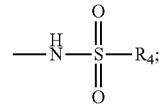

d is the number of $(SO_2X)_d$ attached to $E_1$;
$P_1$, $P_2$, $P_3$, $P_4$ are each independently: absent, —O—, —S—, —SO—, —CO—, —SO$_2$—, —NH—, NR$_2$—, or —R$_3$—; and
$R_2$ is $C_{1-25}$ alkyl;
$R_3$ is $C_{1-25}$ alkylene, $C_{1-25}$ perfluoroalkylene, perfluoroalkyl ether, or alkylether;
$R_4$ is trifluoromethyl, $C_{1-25}$ alkyl, or another $E_1$ group;
$R_8(SO_2X)_d$ is a sulfonated aliphatic or aromatic containing moiety; and
$Q_1$, $Q_2$ are each independently a fluorinated cyclobutyl moiety.

10. The membrane of claim 1 wherein the first perfluorosulfonic acid layer comprises polymer segments 5 and 6:

$$E_1(SO_2X)_d-P_1-Q_1-P_2 \qquad 5$$

$$E_2-P_3-Q_2-P_4 \qquad 6$$

connected by a linking group $L_1$ to form polymer units 7 and 8:

$$+E_2-P_3-Q_2-P_4+_j L_1+E_1(SO_2X)_d-P_1-P_2+_i \qquad 7$$

$$+E_1(SO_2X)_d-P_3-Q_2-P_4+_i L_1+E_2-P_1-Q_1-P_2+_j \qquad 8$$

wherein:
$E_1(SO_2X)_d$ is a sulfonated aromatic-containing moiety;
$E_2$ is an unsulfonated aromatic-containing and/or aliphatic-containing moiety;
$L_1$ is a linking group;
X is an —OH, a halogen, an ester, or

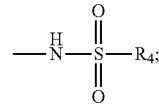

d is a number of $(SO_2X)$ functional groups attached to $E_1$;
$P_1$, $P_2$, $P_3$, $P_4$ are each independently absent, —O—, —S—, —SO—, —SO$_2$—, —CO—, —NH—, NR$_2$—, —R$_3$—, and
$R_2$ is $C_{1-25}$ alkyl;
$R_3$ is $C_{1-25}$ alkylene or $C_{1-25}$ perfluoroalkylene;
$R_4$ is trifluoromethyl, $C_{1-25}$ alkyl, or another $E_1$ group;
$Q_1$, $Q_2$ are each independently a fluorinated cyclobutyl moiety;
i is a number representing repetition of polymer segment 5; and,
j is a number representing repetition of a polymer segment 6.

11. The membrane of claim 1 wherein the first perfluorosulfonic acid layer comprises polymer segments 9 and 10:

$$E_1(SO_2X)_d-P_1-Q_1-P_2 \qquad 9$$

$$E_2(SO_2X)_f-P_3 \qquad 10$$

wherein:

$E_1$, $E_2$ is an aromatic or aliphatic-containing moiety wherein at least one of $E_1$ and $E_2$ include an aromatic group substituted with —$SO_2X$;

X is an —OH, a halogen, an ester, or

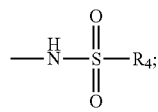

d is the number of ($SO_2X$) functional groups attached to $E_1$;

f is the number of ($SO_2X$) functional groups attached to $E_2$;

$P_1$, $P_2$, $P_3$ are each independently absent, —O—, —S—, —SO—, —$SO_2$—, —CO—, —NH—, —$NR_2$—, —$R_3$—, and $R_2$ is $C_{1-25}$ alkyl;

$R_3$ is $C_{1-25}$ alkylene, $C_{1-25}$ perfluoroalkylene, perfluoroalkyl ether, alkyl ether;

$R_4$ is trifluoromethyl, $C_{1-25}$ alkyl, or another $E_1$ group; and $Q_1$ is a fluorinated cyclobutyl moiety, with the proviso that when d is greater than zero, f is zero and when f is greater than zero, d is zero.

12. A fuel cell incorporating the membrane of claim 1.

13. The multilayer polyelectrolyte membrane of claim 1 wherein the first perfluorocyclobutyl-containing layer is formed by polymerizing a monomer selected from the group consisting of:

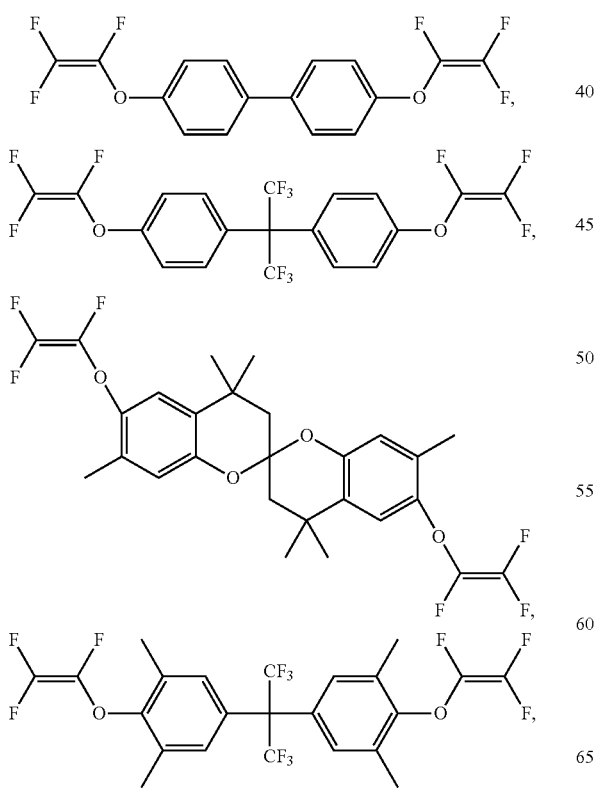

-continued

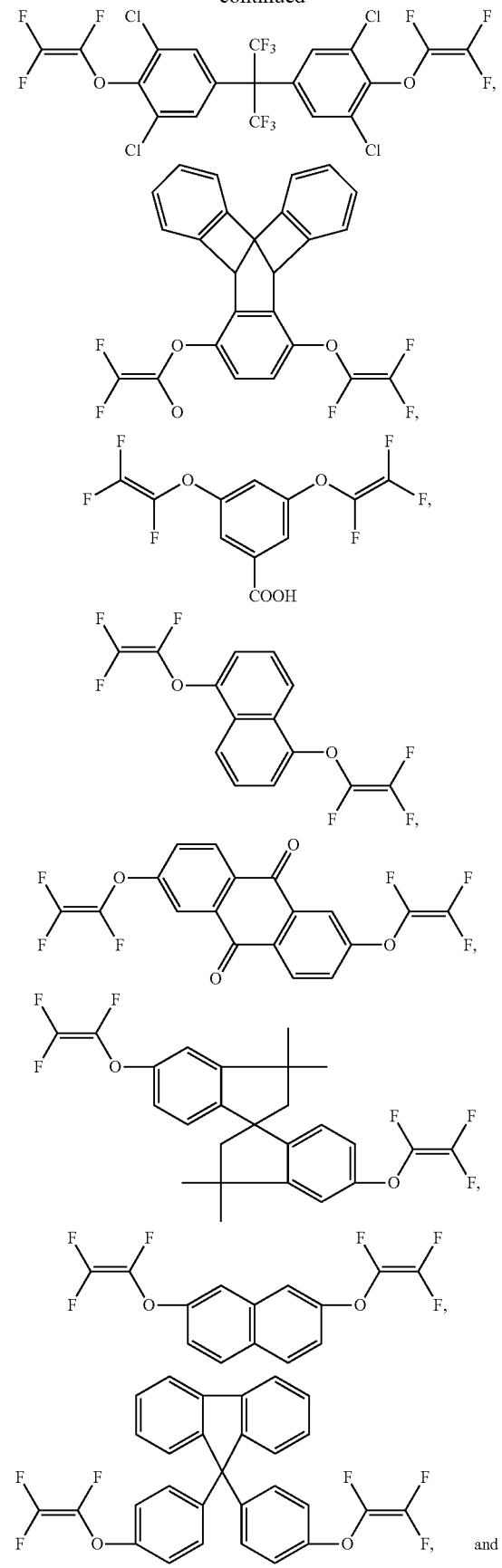

and

-continued
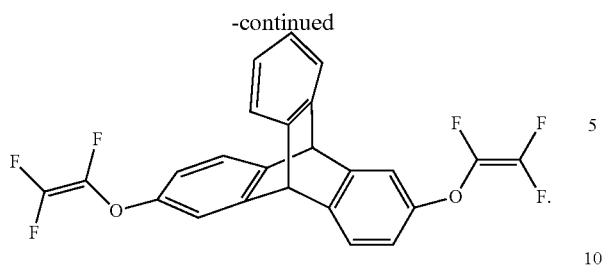
* * * * *